United States Patent Office 3,654,223
Patented Apr. 4, 1972

3,654,223
POLYMERIZATION OF POLYAMIDES IN THE PRESENCE OF AQUEOUS DISPERSIONS OF PHENOLIC ANTIOXIDANTS
Douglas Hogg Thomson, Manchester, England, assignor to Imperial Chemical Industries Limited, London, England
No Drawing. Filed June 6, 1969, Ser. No. 831,233
Claims priority, application Great Britain, June 18, 1968, 29,019/68
Int. Cl. C08g 20/08, 51/58
U.S. Cl. 260—45.95    6 Claims

ABSTRACT OF THE DISCLOSURE

Phenols which are substantially insoluble in water, especially sterically-hindered and polynuclear phenols with antioxidant properties, are brought into stable aqueous dispersion by agitating with water and a surface active compound containing a quaternary ammonium group. Addition of the dispersions to polymer-forming ingredients followed by polymerisation, especially in the case of polyamides, is a useful method of incorporating the phenols in polymers.

---

This invention relates to stable aqueous dispersions of phenols.

When it is desired to make an aqueous dispersion of a substance in water it is usual to employ for this purpose one of the many dispersing agents that are available. Good dispersion is sometimes difficult to achieve when the substance is insoluble or substantially insoluble in water. Particular difficulties arise with phenols which have little or no solubility in water. Important phenols of this kind are those sterically-hindered phenols which have antioxidant properties. By a sterically-hindered phenol I mean, for example, one having a bulky group, for example a tertiary alkyl group, in either the ortho or para position to the phenolic hydroxyl group. Such phenols having antioxidant properties are well-known to the art. It is also known to incorporate such phenols in polymers of various kinds where their antioxidant properties are valuable. Among such polymers are natural polymers such as rubber, and synthetic polymers such as polyolefines, polyesters and polyamides. For incorporating additives in polymers it is sometimes necessary to prepare first an aqueous dispersion. Thus when it is desired to incorporate an additive in a polyamide it is a preferred practice to add an aqueous dispersion of the additive to an aqueous solution of the polyamide-forming ingredients, and then to heat the mixture so as to evaporate off the water which is present initially, and any formed in the polymerisation reaction, and to complete the polymerisation at an elevated temperature. The aqueous dispersion of the additive may, however, be added at some stage during the polymerisation. Where the additive is a phenol which is insoluble or substantially insoluble in water, for example, a sterically-hindered phenolic antioxidant, it has hitherto been difficult to obtain a stable aqueous dispersion. Where the dispersion is unstable, that is to say where the suspended material tends to settle readily, it is difficult in industrial practice to measure out the correct quantity of the phenol as a dispersion. Moreover, there is a tendency for valves and feed lines to become blocked with the settled material. Particular difficulties occur with those sterically-hindered phenolic antioxidants which contain more than one aryl nucleus in the molecule, that is to say with polynuclear phenols. Such polynuclear phenolic antioxidants are particularly important for the stabilisation of synthetic polymers, and especially polyamides, against the degradative effect of heat and oxygen, such as the oxygen of the air.

Among such polynuclear phenolic antioxidants there may be mentioned bis-(2-hydroxy-3-α-methylcyclohexyl-5-methyl phenyl) methane,
1,1,3-tris(2′-methyl-4′-hydroxy-5′-tert.-butylphenyl) butane,
1,1,5,5-tetrakis-(2′-methyl-4′-hydroxy-5′-tert.-butylphenyl) pentane, and
1,2-bis-(2′-hydroxy-3′-tert. - butyl - 5′-ethylphenyl)ethane.

Such phenols are substantially insoluble in water, and it is not possible to obtain stable aqueous dispersions of such phenols by using as dispersing agents compounds which are commonly used as such, for example an alkali metal salt of a polymeric condensation product of formaldehyde and a naphthalene sulphonic acid. In addition to the difficulty of obtaining stable aqueous dispersions, such phenols are difficult to wet.

I have now found that a particular class of compound is especially suitable for use in preparing stable aqueous dispersions of phenols which are substantially insoluble in water. The class of compound is that of surface active compounds containing a quaternary ammonium group. Such compounds have been used hitherto for a variety of purposes such as for the softening of textiles, for ore flotation, and as disinfectants.

Accordingly, my invention provides a stable aqueous dispersions of a phenol which is substantially insoluble in water comprising water, the said phenol and a surface active compound containing a quaternary ammonium group. My invention also provides a process for the manufacture of a said stable aqueous dispersion which comprises mixing together water, a said phenol and a said surface active compound.

Among quaternary ammonium groups I include cycloammonium groups in which the quaternary nitrogen atom is part of a saturated heterocyclic ring.

For a compound to possess surface activity in aqueous media it must contain in the same molecule a hydrophilic group and a hydrophobic group. In the surface active compounds used in my invention, the hydrophilic group is the quaternary ammonium cation. The hydrophobic group is usually a hydrocarbon radical. Particularly suitable hydrocarbon radicals are long chain alkyl radicals, that is alkyl radicals containing at least 10 carbon atoms. A particularly suitable class of surface active compounds for use in my invention is that represented by the general formula

in which R represents an alkyl group having from 10 to 16 carbon atoms, $R_1$, $R_2$ and $R_3$, which may be the same or different, each represents a short chain alkyl group having not more than four carbon atoms, or a benzyl group, provided not more than one represents a benzyl group, and $X^-$ represents an anion. The nature of the anion $X^-$ is not critical and it may, for example, be a chloride, bromide, methosulphate or ethosulphate anion. Particular examples of such suitable surface active compounds are cetyl trimethyl ammonium bromide and lauryldimethylbenzyl ammonium chloride. Also suitable are the so called ampholytic quaternary ammonium surface active compounds in which the quaternary ammonium cation is satisfied by an anion in the same molecule, that is the class of compounds known as betaines.

The aqueous dispersions of my invention may contain up to 25% by weight or even more of the said phenol, although obviously dispersions of a much lower phenol content may be prepared if desired. The amount of surface active agent used is conveniently between 0.1% and 1.0% by weight of the phenol to be dispersed although larger or smaller amounts are possible. The aqueous dispersions are prepared by simple agitation of the water, the phenol and the surface active agent. The period of agitation may be as little as 5 minutes but is conveniently between about 10 minutes and 45 minutes, though longer periods may of course be used. If desired a small amount of an anti-foaming agent, for example a silicone anti-foaming agent, may be added. The temperature of mixing is unimportant, and any temperature between 0° and 100° C. may be employed, but it is convenient to affect mixing at the ambient temperature, say between 5° and 25° C. The surface active compounds used in my invention have the advantage of readily effecting wetting of the particles of the phenol so that a smooth dispersion can be quickly prepared. Moreover the aqueous dispersions of my invention so prepared are stable and do not normally show significant settling over a period of several days at least.

A number of other classes of surface active agents have been examined and none of these offer the advantages offered by the surface active compounds used in my invention of readily wetting the phenol and of forming a stable aqueous dispersion thereof.

The stable aqueous dispersions of my invention are particularly suitable for adding to polymer-forming ingredients, especially polyamide-forming ingredients, which are subsequently polymerised, for the purpose of incorporating the phenol in the polymer. In the case of polyamides the aqueous dispersion is added to the polyamide-forming ingredients which may, for example be an aqueous solution of hexamethylenediammonium adipate (nylon 6,6 salt). The mixture is then heated to the temperature at which polymerisation occurs, normally within the range 200° C. to 300° C., in a closed vessel but with provision for allowing the water added initially and that formed in the polymerisation to escape as steam. As an alternative to adding the aqueous dispersion to the initial mixture of polyamide-forming ingredients, it may be added at some stage during the polymerisation. In the example mentioned the polymer is polyhexamethylene adipamide. It is an advantage of the aqueous dispersions of my invention that they do not interfere with the polyamide-forming reaction. Moreover, the surface active compounds used in my aqueous dispersions have no adverse effect when the desired polyamide is spun into filaments.

The invention is illustrated but not limited by the following examples in which the parts and percentages are by weight.

EXAMPLE 1

Preparation of an aqueous dispersion of the invention 4.9 parts of cetyl trimethyl ammonium bromide and 0.5 part of a silicone anti-foaming agent are added to 4000 parts of water and the mixture agitated until the quaternary ammonium compound dissolves. 100 parts of 1,1,3-tris - (2'-methyl-4'-hydroxy-5'-tert.-butylphenyl) butane are then added and the resulting slurry stirred for 15 minutes to give a smooth stable aqueous dispersion.

EXAMPLE 2

Comparison with other aqueous dispersions

The surface active compounds listed in column I of the following table were stirred into water at a dosage of 0.0625% based on the weight of the water. 1,1,3-tris- (2' - methyl - 4'-hydroxy-5'-tert.-butylphenyl)butane was then added at a dosage of 12.5% based on the weight of the water. The mixtures were agitated for 15 minutes. The proportion of the added phenol which had been wetted was estimated by visual observation of the slurry, and the proportion is indicated in column II of the table. Where a reasonable degree of wetting had been achieved the resulting dispersion was allowed to stand and the stability assessed visually. The stability is indicated in column III of the table.

TABLE

| I, surface active compound | II, percent of phenol wetted | III, stability of dispersion |
| --- | --- | --- |
| A. Compounds for use in the invention: | | |
| Cetyl trimethylammonium bromide | 100 | Stable for several days. |
| A betaine containing a long chain alkyl (dodecyl) group. | 100 | Stable. |
| B. Comparison compounds: | | |
| Potassium palmitate | 60 | Unstable. |
| Sulphonated methyl oleate | 75 | Do. |
| Sodium dioctylsulphosuccinate | 100 | Do. |
| Sodium salt of a naphthalenesulphonic acid/formaldehyde condensate. | 1 | |
| Sodium hexametaphosphate | 5 | |
| Sulphonated phenol/formaldehyde condensate. | 1 | |
| Diethanolamine | <1 | |
| 4-Dimethylaminopyridine | 50 | |
| Nonylphenyl/ethylene oxide condensate | 75 | Unstable.* |
| Polyoxyethylene sorbitan monooleate | 60 | Wetted portion stable.* |
| A fatty amine/ethylene oxide condensate | 75 | Do. |
| 3-Aminopropionic acid (β-alanine) | 60 | Unstable. |

*In these dispersions excessive froth is observed which "traps" the unwetted phenol.

In column III of the table the term "Unstable" means that within a few minutes of the end of agitation a clear layer could be seen from which the phenol had settled. "Stable" means that there is no evidence of bulk settling.

EXAMPLE 3

A 12.5% aqueous slurry of 1,1,3-tris-(2'-methyl-4'-hydroxy-5'-tert.-butylphenyl)butane prepared as in Example 2 with cetyl trimethyl ammonium bromide as the surface active compound was allowed to stand for 15 days during which the concentrations of the phenol at the top and bottom of the vessel were determined at intervals. The concentrations fell within the range 10.7% to 13.2% indicating that there had been no significant settling of the phenol.

EXAMPLE 4

Use of an aqueous dispersion of the invention in polymer formation 5 parts of the aqueous dispersion of Example 1 are added through a lock to an autoclave containing, at a temperature of 220° C., a partially polymerised mixture resulting from heating to that temperature an initial charge of 2263 parts of nylon 6,6 salt and 0.765 part of sodium hypophosphite in water. At about the same time 40 parts of titanium dioxide as a 40% (by weight) aqueous dispersion are also added through a separate lock. The mixture is further heated, allowing water to escape as steam, until a final temperature of 274° C. is reached. The molten nylon 6,6 polymer is then extruded from the autoclave and cooled so that it solidifies. The polymer may be spun satisfactorily into filaments.

I claim:

1. A stable aqueous dispersion of a sterically-hindered polynuclear antioxidant phenol which is substantially insoluble in water comprising water, up to 25% by weight, calculated on the weight of the dispersion, of the said phenol, and from 0.1% to 1% by weight, calculated on the weight of the phenol, of a surface active compound represented by the general formula

in which R represents an alkyl group having from 10 to 16 carbon atoms, and $R_1$, $R_2$ and $R_3$ which may be the same or different, each represent a short chain alkyl group having not more than four carbon atoms, or a benzyl group, provided not more than one of $R_1$, $R_2$ and $R_3$ represents a benzyl group, and $X^-$ represents an anion.

2. The dispersion of claim 1 in which the surface active compound is cetyltrimethylammonium bromide or lauryl-dimethylbenzylammonium chloride.

3. The dispersion of claim 1 in which the surface active compound is an ampholytic quaternary ammonium surface active compound in which the quaternary ammonium cation is satisfied by an anion in the same molecule.

4. The dispersion of claim 1 in which the phenol is bis-(2-hydroxy-3-α-methylcyclohexyl-5-methylphenyl)methane, 1,1,3-tris(2'-methyl-4'-hydroxy-5'-tert.-butylphenyl)butane or 1,1,5,5-tetrakis-(2'-methyl-4'-hydroxy-5'-tert.-butylphenyl)pentane.

5. A process for the incorporation in a fiber-forming polyamide of a phenol which is substantially insoluble in water which comprises adding to polyamide-forming ingredients the stable aqueous dispersion of a phenol of claim 1 and then effecting polymerisation.

6. The process of claim 5 in which the polyamide is polyhexamethylene adipamide.

References Cited

UNITED STATES PATENTS

| | | |
|---|---|---|
| 2,986,488 | 5/1961 | Weisgerber et al. _____ 252—311 |
| 3,222,201 | 12/1965 | Boyle et al. _____ 252—312 |
| 3,410,819 | 11/1968 | Kourtz et al. _____ 260—45.95 |
| 3,485,795 | 12/1969 | Gilles _____ 260—45.95 |
| 3,487,044 | 12/1969 | Tholstrup _____ 260—45.95 |
| 3,522,209 | 7/1970 | Lee _____ 260—45.95 |

DONALD E. CZAJA, Primary Examiner

E. C. RZUCIDLO, Assistant Examiner

U.S. Cl. X.R.

252—311; 260—45.9, 78 R